(12) United States Patent
Hussey

(10) Patent No.: US 12,179,603 B2
(45) Date of Patent: Dec. 31, 2024

(54) NATIONAL INDIVIDUAL FLOATING TRANSPORT INFRASTRUCTURE

(71) Applicant: STICHTING KATHOLIEKE UNIVERSITEIT, Nijmegen (NL)

(72) Inventor: Nigel Edward Hussey, Nijmegen (NL)

(73) Assignee: STICHTING KATHOLIEKE UNIVERSITEIT, Nijmegen (NL)

( * ) Notice: Subject to any disclaimer, the term of this patent is extended or adjusted under 35 U.S.C. 154(b) by 820 days.

(21) Appl. No.: 17/415,520

(22) PCT Filed: Nov. 25, 2019

(86) PCT No.: PCT/NL2019/050777
§ 371 (c)(1),
(2) Date: Jun. 17, 2021

(87) PCT Pub. No.: WO2020/130804
PCT Pub. Date: Jun. 25, 2020

(65) Prior Publication Data
US 2022/0059269 A1 Feb. 24, 2022

(30) Foreign Application Priority Data
Dec. 21, 2018 (NL) .................................. 2022276

(51) Int. Cl.
B60L 13/10 (2006.01)
B60L 13/06 (2006.01)
B61B 13/08 (2006.01)
H02N 15/00 (2006.01)
H01F 7/20 (2006.01)

(52) U.S. Cl.
CPC ............... *B60L 13/10* (2013.01); *B60L 13/06* (2013.01); *B61B 13/08* (2013.01); *H02N 15/00* (2013.01); *H01F 7/204* (2013.01)

(58) Field of Classification Search
CPC .......... B60L 13/06; B60L 13/10; H01F 7/204; B61B 13/08; H02N 15/00
See application file for complete search history.

(56) References Cited

U.S. PATENT DOCUMENTS

| 1,020,942 A | * | 3/1912 | Bachelet | H02K 41/03 |
| | | | | 104/282 |
| 3,771,033 A | * | 11/1973 | Matsui | B60L 13/03 |
| | | | | 104/282 |
| 3,815,511 A | | 6/1974 | Dukowicz et al. | |

(Continued)

FOREIGN PATENT DOCUMENTS

| JP | 2002238109 A | | 8/2002 |
| JP | 2004534496 A | * | 11/2004 |

(Continued)

OTHER PUBLICATIONS

Written Opinion issued for PCT/NL2019/050777.

*Primary Examiner* — Scott A Browne
(74) *Attorney, Agent, or Firm* — AEON Law, PLLC; Adam L. K. Philipp; Charlotte E. Holoubek

(57) ABSTRACT

The present invention is in the field of a National Individual Floating Transportation Infrastructure (NIfTI) wherein floating vehicles can travel by magnetic levitation and propagation. The vehicles can travel at a controllable height above the existing, albeit modified, road infrastructure and at relatively high speeds.

16 Claims, 5 Drawing Sheets

(56) References Cited

U.S. PATENT DOCUMENTS

| | | | | |
|---|---|---|---|---|
| 5,628,252 | A | * | 5/1997 | Kuznetsov .............. B60L 13/10 104/284 |
| 6,363,857 | B1 | * | 4/2002 | Kauffman ............... B61B 13/08 104/88.01 |
| 8,109,353 | B2 | * | 2/2012 | Gurol ...................... B60M 7/00 180/65.1 |
| 9,511,681 | B2 | * | 12/2016 | Wernersbach ..... G05B 19/4189 |
| 2008/0083346 | A1 | * | 4/2008 | Fiske ................... B60L 13/003 104/283 |
| 2010/0192799 | A1 | * | 8/2010 | Miller .................... B61B 13/10 104/138.1 |
| 2014/0331888 | A1 | * | 11/2014 | Wernersbach ........ B60L 13/006 104/282 |
| 2015/0083018 | A1 | * | 3/2015 | Clark ................... B60L 13/003 104/282 |

FOREIGN PATENT DOCUMENTS

| | | | | |
|---|---|---|---|---|
| JP | 2007274838 | A | | 10/2007 |
| KR | 20180088769 | A | * | 8/2018 |
| RU | 2698408 | C1 | * | 8/2019 ............. B60L 13/04 |

* cited by examiner

Levitation

Propulsion

NATIONAL INDIVIDUAL FLOATING TRANSPORT INFRASTRUCTURE

This application is a national entry of International Patent Application PCT/NL2019/050777, filed Nov. 25, 2019, in the name of "NATIONAL INDIVIDUAL FLOATING TRANSPORT INFRASTRUCTURE", which claims priority to Netherlands Patent Applications with Serial No. 2022276, filed Dec. 21, 2018, in the name of "NATIONAL INDIVIDUAL FLOATING TRANSPORT INFRASTRUCTURE". The entire contents of the above-referenced applications and of all priority documents referenced in the Application Data Sheet filed herewith are hereby incorporated by reference for all purposes.

STATEMENT REGARING FEDERALLY SPONOSRED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

FIELD OF THE INVENTION

The present invention is in the field of a National Individual Floating Transport Infrastructure (NIfTI) wherein floating vehicles can travel by magnetic levitation and propagation. The vehicles can travel at a controllable height above the existing, albeit modified, road infrastructure and at relatively high speeds.

BACKGROUND OF THE INVENTION

The present invention is in the field of individual transportation. Until now, cars based on the combustion engine have played an important role in transporting people. Recently, a transition towards partly or fully electrically driven cars has started, and further partly or fully self-driving vehicles are on their way to being developed. If a full transition towards electrically driven vehicles would take place, the energy demands on our power generation and distribution infrastructure would be enormous. Moreover, fatalities and injuries due to road accidents have remained roughly constant over the past two decades and even with the gradual introduction of autonomous vehicles, the design of modern cars, coupled with their weight, means that any collision with such a vehicle will likely lead to serious injury or even death. Finally, congestion due to our current infrastructure and the sheer volume of traffic represents a major economic and productivity cost to developed and developing economies. Unfortunately, this is unlikely to change with the advent of the electric car.

In the search for an alternative means of transportation of passengers and freight, the magnetic levitation concept has been developed. The concept relates to a system conceived for train transportation. It uses two sets of magnets, a first set to lift the train up, and a second set to move the 'floating train' ahead. Since the train is floating, friction is virtually absent and the train can move at great speed. An advantage of this technology is the absence of moving parts. However, the train still needs to travel along a guideway of magnets which control the train's stability and speed, and in view of safety, movement of the train is limited to a direction of propagation. The trains can move fast and acceleration and deceleration is also much faster than e.g. for other vehicles such as conventional trains; safety and comfort are still points of attention. The power needed for levitation is relatively small, whereas air resistance and drag, especially at lower speeds, consume most energy. This could be overcome by moving vehicles in a vacuum environment. The construction of magnetic levitation systems is however relatively costly, though production and maintenance is cheaper, compared to high speed trains. Not many systems are in operation yet.

Some documents recite propagation of vehicles. JP 2002 238109 (A) recites a system for driving, propelling and controlling a small and lightweight car with a linear motor. Thereto magnetic coils for driving and propelling the car and permanent magnets are each provided at the ground side and at the vehicle side respectively. The coils are arranged in a linear state to the direction of movement, with each coil being wired in parallel with slip rails in a ladder state. U.S. Pat. No. 3,815,511 (A) recites a magnetic propulsion and levitation system for a vehicle which is adapted to travel over an established roadbed. The system includes one or more superconducting magnets carried by the vehicle and a plurality of coils embedded in the roadbed in the path of travel of the vehicle. The coils are sequentially energized at a predetermined position relative to the superconducting magnet for establishing levitation and propulsion forces. It is noted that superconducting magnets typically require cooling to low temperatures.

The present invention relates to an improved floating vehicle and infrastructure, which overcomes one or more of the disadvantages with the above systems without jeopardizing functionality and advantages.

SUMMARY OF THE INVENTION

The present invention relates in a first aspect to a method of transferring an individual vehicle module over an infrastructure (NIfTI). Contrary to the above MagLev systems, which use onboard magnets and reaction magnets, the present system has coils embedded in its tracks. An advantage thereof is that e.g. compared to electrical cars only about 20-50% of the energy is required. Also no batteries are required, such as Li batteries; it is noted that Li is a relatively scarce material. Furthermore, no energy needs to be stored (save for the onboard sensing, interfacing and lighting), and hence no energy for storing and retracting is needed, and no energy is lost during storing and retracting. As the present vehicles can be stripped of virtually all mechanical and propagation components, their net weight is reduced to some 200-400 kg. As with MagLev systems, little friction is experienced during movement; however some magnetic drag may be present, which reaches a maximum at lower velocities (e.g. <10 m/sec). The present vehicle is a levitating vehicle with an off-board propulsion system that uses a series of pulses rather than a three-phase AC signal as used typically in linear motor devices. The arrangement of the magnet poles is also distinct. A sketch of NIFTI is given in FIG. 1a-b, which shows the pod at rest in the left panel and shows the principle of propulsion in the right panel. The vehicle in which the passengers are seated may have similar dimensions to a car. All seats may be pointed inwards. In the middle, a table may be provided. On this table a screen may be provided, on which the passengers can enter their destination or simply be entertained. The present vehicle is much lighter than (electric) cars and damage inflicted by collisions is therefore expected to be much less grave; still the vehicle is preferably made of an impact-resistant material and energy/shock absorbing zones are preferably provided. The present vehicle is also much cheaper, as only a small set of components need to be provided therein.

Levitation of the vehicle is achieved by the z-component of the magnetic field induced by the coils. In addition to the present coils, at least some of the coils may comprise a core of a permanent magnet; these permanent magnets may provide a magnetic vertical force equal to 10-98% of the empty weight of the present vehicle, preferably 20-50%, such as 30-40%, therewith contributing to the levitation force and reducing overall energy consumption in the coils without inducing forward motion. Initially, the magnet and hence the present vehicle module, lies flat on the track in which the coils are embedded, tilted with respect to the vertical. When the coils are energized, the vehicle will start to levitate at a certain height above the track, typically a few cm, and accelerate due to the tilt of the magnets. Guiding magnets may be installed as part of the track to make sure that the vehicle does not drift off the track itself. As the vehicle is moving, the coils only need to be energized for a short while during which the vehicle is forced forwards, and therefore can be pulsed. A response mechanism, provided by a controller, pulses the coils at the precise moment the pod is above them such that the vehicle maintains its speed. By placing the coils and permanent magnets strategically, the amount of current needed is found to be minimised. In order to further decrease the amount of energy required, conducting plates, e.g. aluminium plates, may be included as part of the tracks to allow the vehicle to glide over certain sections of road without the need for energized coils.

In the present method, an advanced infrastructure is provided. It is noted that said infrastructure may still largely coincide with an existing road infrastructure, e.g. in terms of routes, access to the infrastructure, tracks already provided, and so on. It is considered that especially when renovating existing infrastructure, the present infrastructure may be included in the existing infrastructure, at least partly. At least one individual track is provided, and typically a multitude of interconnected tracks may be provided. Each track comprises at least one series of coils, wherein series of coils extend over the width of the track, so rows of coils are provided, each coil pointing upwards with a slight tilt. Therewith each series of coils is adapted to provide a levitational (vertical) magnetic force as well as a horizontal magnetic force. The horizontal magnetic force is directed along the length direction of the track. The coils are placed at distance from one another. In order to have active and inactive coils, at least one switch per series of coils is provided, and optionally at least one switch per coil, such that each individual coil can be energized. The switching technology may comprise transistors, such as MOSFETs. Each coil individually can be energized by an electrical current and de-energized. In order to keep the present vehicle on the track, and to prevent accidents, as well as for clearly identifying the track, on at least one side of the track guiders may be provided. The guider comprises at least one section, typically a large number of sections, which are connected to one another. Each individual section of the guider can be energized, and there with a guider is adapted to control the motion of the vehicle module, such as by restricting movement and deceleration of the vehicle. It is noted that in the continuous motion of the vehicle overcomes Earnshaw's theorem, which states that a collection of point charges cannot be maintained in a stable stationary equilibrium configuration solely by the electrostatic interaction of the charges. When decelerating, magnets in the guider may be energized. When unexpected deceleration is required, such as in a case of an impending accident, the magnets in the guider will be energized with as large a current as possible. Finally, an electrical power supply for providing an electrical current is present, which may be the grid, or a sub-grid.

The present vehicle is void of an engine, wheels, battery, suspension, steering wheel, etc. and has therefore a reduced weight, while maintenance thereof is very limited. The vehicle comprises an array of permanent magnets, preferably at a bottom side thereof. For the passengers, at least one seat is provided, or at least something for making a journey pleasant to a passenger. In view of the absence of an engine, much more space is available for passengers. The present module could therefore be relatively small. Typically more passengers could be present, and hence larger modules are considered, with e.g. 2-9 seats. In order for full control, the present vehicle module comprises an identifier, which may be used for controlling movement. As the passenger typically needs to identify a destination, a control interface may be present; however, existing infrastructure in this respect, such as smartphones, computers, the web, and so on may also be used.

When moving to a destination the present vehicle module is lifted, by providing a vertical component of the magnetic field and corresponding field gradient in the track at the location of the vehicle module. A horizontal component of the magnetic field is also provided, thereby enabling the module to be propelled at a certain speed in a horizontal direction over the track. Once the destination is reached, or in other occasions, the horizontal magnetic field is cancelled and/or an opposite magnetic field in the track may be provided, preferably by the guiders, thereby decelerating the module and bringing the module to a stop. At the same time, the vertical magnetic field in the track may be cancelled, thereby letting the module down onto the track.

Advantages of the present invention are therefore an infrastructure with all the freedom of the car, but without the car itself, use of the existing road network, wherein the road becomes the engine, thereby removing most of the weight from the "vehicle", wherein magnetic repulsion is used for both levitation and propulsion, and an optional on-board interface for receiving instructions. The time spent in transit is entirely one's own. The amount of energy needed is about 35 mJ/100 km (already equivalent to the caloric value of 0.5 l of petrol or diesel), which can be reduced significantly by providing further measures. With sufficient attention, it is considered possible to reach an order of magnitude less energy consumption than an electric car. With a mass $<\frac{1}{4}$ that of an electric car and a streamlined shape, traffic mortalities are reduced, and since all traffic would be controlled by a central operating system, congestion may be prevented. The sense of ownership moves from the car to the infrastructure, and mobility for all people is provided, for any age, for any disability, and so on.

In a second aspect, the present invention relates to the above mentioned infrastructure, and in a third aspect to the above mentioned vehicle module.

Thereby the present invention provides a solution to one or more of the above mentioned problems.

Advantages of the present invention are detailed throughout the description.

DETAILED DESCRIPTION OF THE INVENTION

The present invention relates in a first aspect to a method of transferring a vehicle module over an infrastructure according to claim 1. An advanced study on boundary conditions for the present system is given in a BSc thesis of A. Kool, RU Nijmegen (Introducing a new mode of transport: NIfTI as an alternative to the electric car.), whose contents are incorporated by reference thereto.

In an exemplary embodiment of the present method, at least once, two series of coils may be interrupted by an electrically conducting plate, wherein the conducting plate extends in a longitudinal direction and width direction of the track.

In an exemplary embodiment of the present method, at least one permanent magnet is inserted into the bore of individual coils within a series of coils.

It has been found that therewith energy consumption can be reduced by more than 50%.

It is noted that at higher speeds, energy consumption may be reduced relative to lower speeds due to a reduction in (magnetic) drag and in the pulse duration within the coils.

In an exemplary embodiment of the present method, each series of coils may comprise each individually, at least one coil and/or part thereof which is slightly tilted, with respect to a vertical axis, that is perpendicular to a surface, such as tilted 0.5-40°, preferably 2-30°, more preferably 5-20°. Therewith both a horizontal and vertical magnetic force may be provided to the present vehicle module. For instance a tilt of 30° would still provide some 87% of the lift force and 50% propulsion force. A tilt would be in the direction of intended movement, so in a two lane street the tilt at each lane would be opposite with respect to one and another.

In an exemplary embodiment of the present method, coils, typically series of coils, each individually, may be separated by a distance of 5-50 cm, such as 5-20 cm, which distance is typically in the direction of movement.

In an exemplary embodiment of the present method, a track has a width of 0.6-3 m, such as 1.0-2.5 m. These tracks are therefore smaller then typically used tracks. As such more tracks per existing infrastructure may be provided. Part of the tracks may be especially adapted, being a bit broader, for the transport of goods, such as in intermodal containers of a width of slightly less than 2.5 m, especially on tracks for transport over long distances.

In an exemplary embodiment of the present method, a vehicle module has a width of 0.6-3 m, preferably 1-1.5 m.

In an exemplary embodiment of the present method, a vehicle module has a length of 0.6-3 m, preferably 1-1.5 m.

In an exemplary embodiment of the present method an empty vehicle module has a weight of 200-600 kg, such as 300-500 kg. The vehicle is relatively light, especially in comparison to existing vehicles, and are in fact comparable to the weight of motor cycles.

In an exemplary embodiment of the present method, at least two vehicle modules may be connectable. In view of transportation and limiting a number of movements such may be an advantage.

In an exemplary embodiment of the present method, a coil, each individually, may have a length 1-60 cm, preferably 2-40 cm, such as 10-30 cm. Such coils are found to provide sufficient magnetic forces.

In an exemplary embodiment of the present method, a coil, each individually, may have a radius of 1-20 cm, preferably 2-10 cm, more preferably 3-5 cm.

In an exemplary embodiment of the present method, a coil, each individually, may have a thickness of 0.1-10 cm, preferably 0.2-5 cm, more preferably 1-3 cm.

In an exemplary embodiment of the present method, a coil, each individually, may have a number of windings $n_c \in [1,10000]/m$, preferably 10-5000, more preferably 50-2500, such as 100-500.

In an exemplary embodiment of the present method, a coil, each individually, may comprise an electrically conducting material, such as a metal, such as copper.

In an exemplary embodiment of the present method, a series of coils may be adapted to provide a magnetic field $B_z$ of $10^{-3}$-$10^1$ [T], preferably $2*10^{-3}$-2 [T], more preferably $3*10^{-3}$-$10^{-1}$ [T].

In an exemplary embodiment of the present method, over a width of a track 1-100/m coils in series may be provided.

In an exemplary embodiment of the present method, two series of coils may be separated by a distance of 5-20 cm.

In an exemplary embodiment of the present method, a magnet may comprise high magnetic density materials.

In an exemplary embodiment of the present method, a magnet may comprise at least one magnetic material selected from Group 3-12, Period 4-6 elements, such as Fe, Co, Ni, and Nd, and combinations thereof comprising such a magnetic material, such as $Nd_2Fe_{14}B$, FePd, FeCo, and FePt, and/or a material selected from lanthanoids, scandium, yttrium, and combinations thereof, such as from Sc, Y, Sm, Gd, Dy, Ho, Er, Yb, Tb, such as Tb.

In an exemplary embodiment of the present method, a magnet has a volumetric susceptibility of $10^3$-$10^6$, such as $10^3$-$3*10^5$.

In an exemplary embodiment of the present method, each coil individually may be adapted to receive a current of 0.5-200 [A], preferably 1-100 [A], such as 5-50 [A].

In an exemplary embodiment of the present method, a switch may be adapted to switch within 1000 μsec, preferably within 100 μsec.

In an exemplary embodiment of the present method, each coil may be adapted to be energized within 1-$10^3$ μsec.

In an exemplary embodiment of the present method, each coil may be energized in a pulsed mode, such as in pulses of 1-100 msec, wherein preferably a length of a pulse is adapted to the speed of the vehicle module.

In an exemplary embodiment of the present method, the speed of the vehicle module may be from 0-150 m/sec, preferably from 0-75 m/sec, more preferably from 0-40 m/sec, such as 5-30 m/sec.

In an exemplary embodiment of the present method, the vehicle module may comprise an array of $i \in [1,p]$ magnets with a spatially rotating pattern of magnetisation, wherein a first magnet has a first magnetization, an $i^{th}$ magnet adjacent to $(i-1)^{th}$ has a magnetization rotated over $i*\pi/n$ along a horizontal axis, and an $n^{th}$ magnet has a magnetization parallel to the first magnetization, such that below the array and bottom of the vehicle module, an amplified magnetic flux remains and above the array, a net magnetic flux is substantially cancelled, such as a Halbach array. An advantage of using a Halbach array is that by using the same amount of magnet, a lower current is needed to levitate and move the vehicle. The current in a row of coils will be oriented such that maximum levitation and propulsion of the module can be achieved.

In an exemplary embodiment of the present method, 50-100% of the bottom of the vehicles may be provided with magnets, magnets have a height of 1-25 cm, preferably 1.5-10 cm, such as 2-5 cm. It is found that in view of forces the weight of magnets is preferably not too small.

In an exemplary embodiment of the present method, a length of all magnets may be 20-200 cm; preferably 40-120 cm, such as 45-100 cm, and there with a substantial part of the bottom of the vehicle may be provided with magnets.

In an exemplary embodiment of the present method, magnets may be provided above or below a bottom of the vehicle, preferably below a bottom.

In an exemplary embodiment of the present method, a total volume of magnets may be $0.1*10^{-3}$-$50*10^{-3}$ $m^3$.

In an exemplary embodiment of the present method, a magnetic moment may be 0.1-2000 $Am^2$, preferably 1-500 $Am^2$.

In an exemplary embodiment of the present method, coils may provide an acceleration of 0.01-10 m/sec$^2$, preferably 0.2-5 m/sec$^2$. This relatively low acceleration will still bring vehicle modules up to a decent speed in a short period of time, and to high speeds in acceptable times as well.

In an exemplary embodiment of the present method, guides may provide a deceleration of 1-20 m/sec$^2$, preferably 2-10 m/sec$^2$.

In an exemplary embodiment of the present method, the vehicle module may comprise an array of $i \in [1,p] * j \in [1,o]$ magnets, wherein at least one series of $j \in [1,o]$ magnets comprises a spatially rotating pattern of magnetisation, preferably all series of $j \in [1,o]$ magnets, wherein p is preferably from $2\text{-}10^3$, such as 5-100, and wherein o is preferably from $2\text{-}10^3$, such as 5-100.

In an exemplary embodiment of the present method, the controller may be adapted to control hovering of the vehicle module.

In an exemplary embodiment of the present method, a multitude of vehicle modules may be transferred, such as millions of vehicles. Clearly control of movement and operating tracks would involve lots of computing time, but nowadays that is not much of an issue.

In an exemplary embodiment of the present method, the infrastructure may be partly or fully incorporated into an existing infrastructure, wherein at least one track, each individually, is covered by a protecting layer, such as a 0.2-5 cm thick polymeric layer, preferably a recycled polymeric layer. For instance a bicycle path adjacent to the present track may be made entirely out of recycled plastic bottles, having a 30-40 year life span (c.f. 15 years for tarmac), and having virtually no $CO_2$ emissions. Similar thereto, there is no need for tarmac with NIfTI. Hence, such paths could be the surface covering for NIfTI too.

In an exemplary embodiment of the present method, the infrastructure may comprise physical and/or controllable guiders, such as a rail, guidance coils, wherein guidance coils may be oriented accordingly.

In an exemplary embodiment of the present method, the vehicle module may be a monocoque, wherein the vehicle module preferably comprises at least one composite.

In an exemplary embodiment of the present method, a drag coefficient of the vehicle $C_D<0.3$, preferably $C_D<0.2$, such as $0.05<C_D<0.13$, such as a droplet shaped vehicle. With the present vehicle modules much more freedom in design is obtained, as virtually no parts are present. Room for optimization in this (and other) aspects is therefore provided.

In an exemplary embodiment of the present method, the vertical magnetic field is applied to the centre of mass of the magnetic base, and/or wherein the horizontal magnetic field is applied to the same centre of mass.

In an exemplary embodiment of the present method, the vehicle module impact on collision may be minimized, for instance such that pedestrians would be deflected instead of hit square on.

In an exemplary embodiment of the present method, at a junction of tracks at least one rotatable coil may be provided, preferably at least one rotatable series of coils, wherein rotation along a vertical axis is provided, such as over 180-360°. Such would be a small part of the track that could comprise moving elements.

In an exemplary embodiment of the present method, tracks at a junction are split, such as into one track for going straight ahead, one for going left, and one for going right.

In an exemplary embodiment of the present method at a junction intersect no guiders are provided. Therewith, the present vehicle may move from one track to another.

In an exemplary embodiment, the present infrastructure may comprise a hollow tube-like structure, such as under the road, wherein a surface of the tube-like structure comprises a polymeric material, such as a plastic, such as a recycled plastic, wherein the surface is preferably removable attached, wherein in the tube-like structure coil receiving elements are provided, such as a rack with tilted coil positions. Therewith the present infrastructure can be operated with ease, is constructed in a low tech manner, and can be maintained well.

In an exemplary embodiment the present vehicle module may comprise an array of permanent magnets, preferably at a bottom side thereof, at least one seat, preferably 2-9 seats, such as 3-4 seats, an identifier, and an optional control interface.

The present vehicle module and infrastructure may be used in the present method.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims. In addition reference is made to an article submitted for publication by N. Hussey, which article and its contents are incorporated by reference.

DETAILED DESCRIPTION OF FIGURES

Figure 1A:
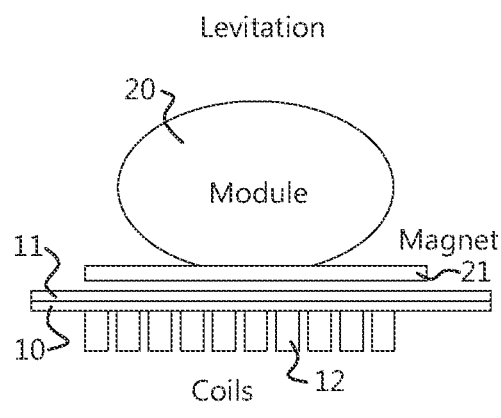
FIGS. 1*a,b*, 2-4, 5*a-c*, and 6-8 show details of the present invention.
Figure 1B:
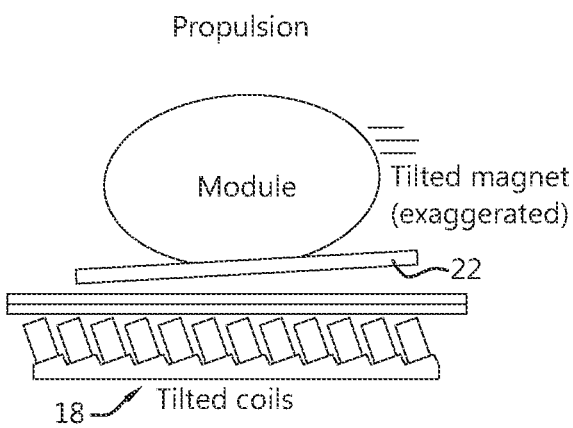
Figure 2:
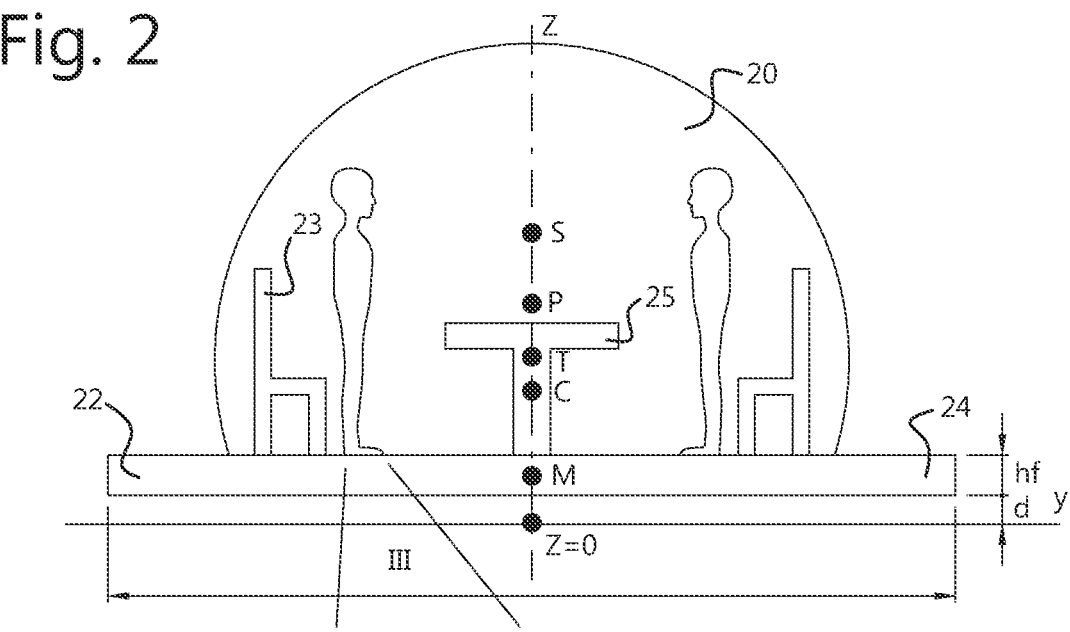
Figure 3:
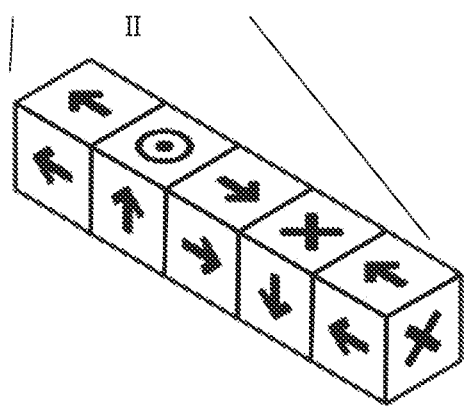

FIG. 1: A raw sketch of NIfTI. The left panel 1a shows the vehicle 20 at rest comprising magnets 21 in a bottom side 22 thereof, levitating above its track 11 with coils 12. The right panel 1b shows the vehicle moving to the left, with a general sketch of the propulsion system. A rack 18 is provided for receiving the coils in a tilted position. FIG. 2: A sketch of the cross section of the pod 20. In the middle is the table 25, on the sides there are two passengers. For clarity of the sketch, persons 2 and 4 are not included. In the picture, M is the centre of mass of the magnet, T is the centre of mass of the table, P is the net centre of mass of the people, C is the net centre of mass of the chairs and S is the centre of mass of the pod itself. The point z=0 is at the top of the coils, $h_f$ below the middle of the magnet. A typical mass of a vehicle, including four passengers is calculated to be some 500-600 kg. Seats 23, bottom 22, and identifier 24 are also indicated.

Figure 4:
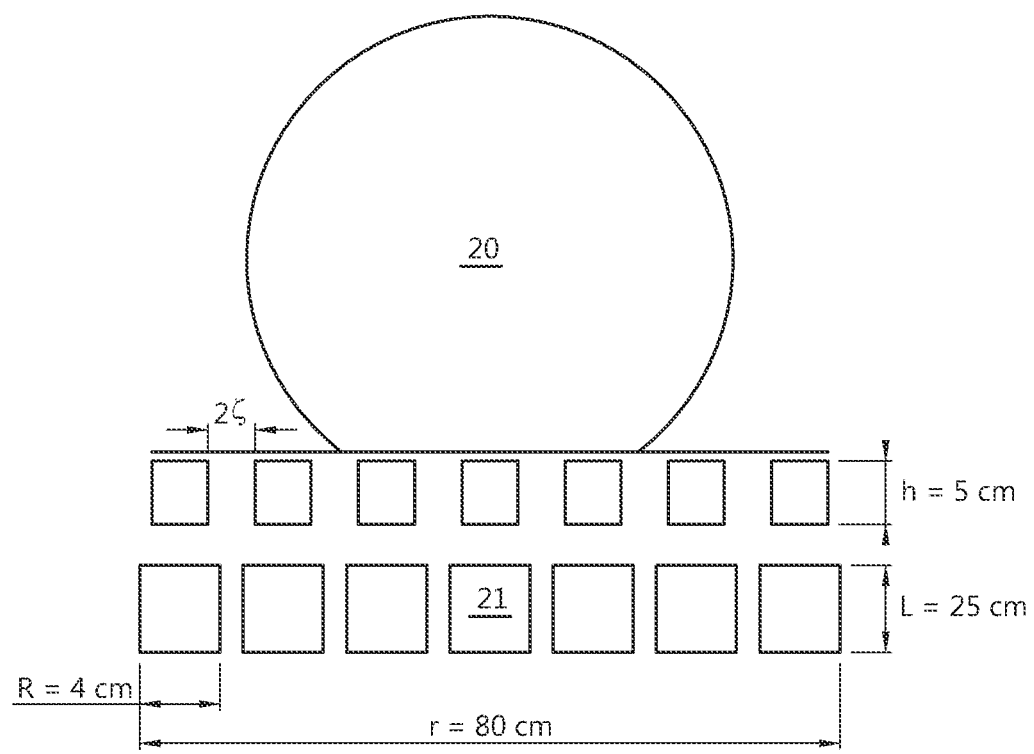

FIG. 4 shows an enlargement of a part of the magnet array 21 provided in the vehicle module, with a spatially rotating pattern of magnetization, wherein rotation is over 90°.

FIG. 4: A sketch of the vehicle 20 with a base of magnetic strips instead of an entire magnet. This view can be seen as a front of behind view on the pod, since the strips are in the direction of motion.

Figure 5A:
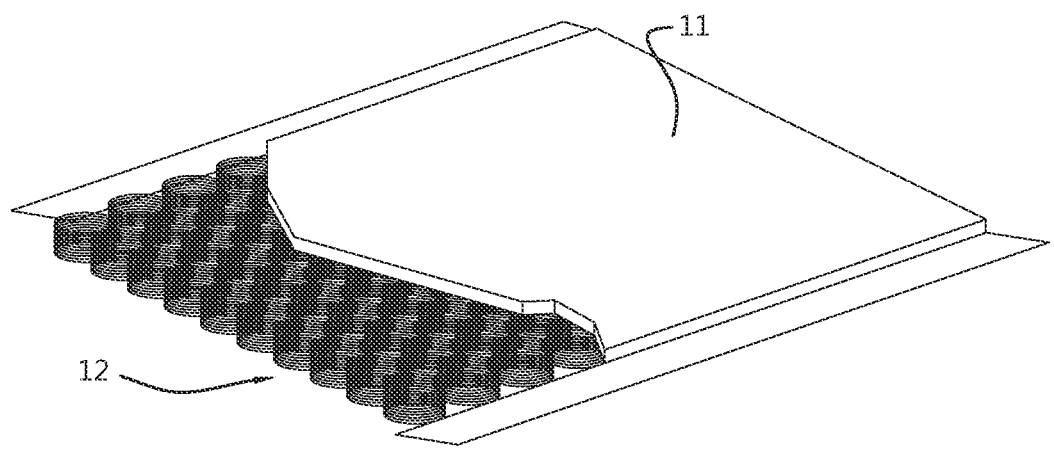
Figure 5B:
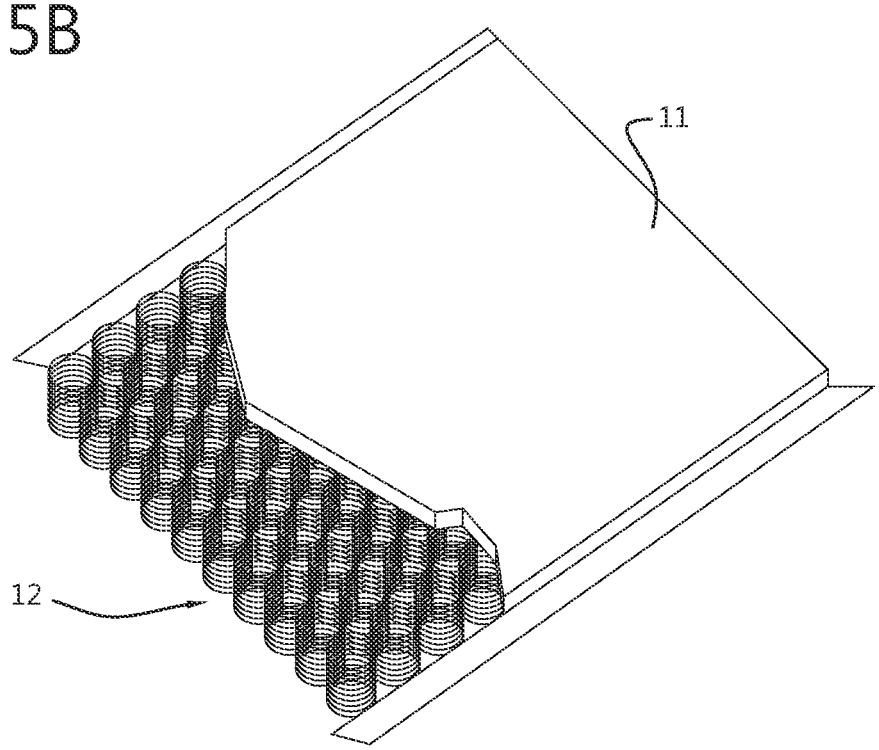
Figure 5C:
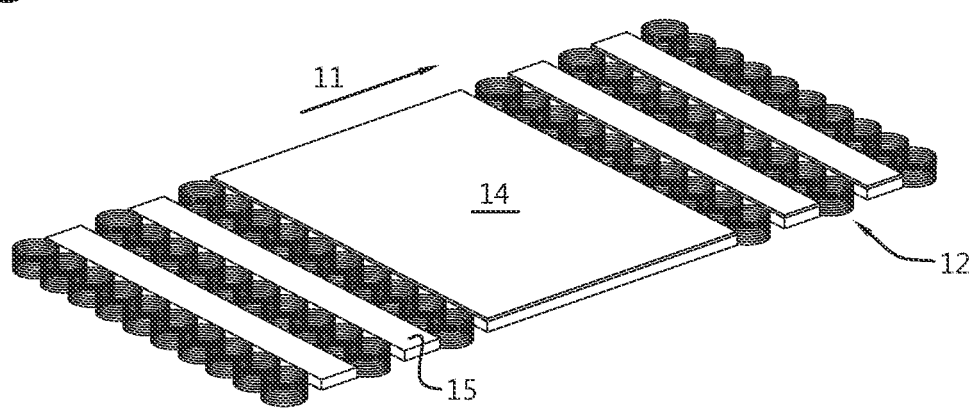

FIGS. 5*a-b* show a part of track 11 with series of coils 12 provided underneath the track. FIG. 5*c* further shows conducting plate 14, and permanent magnets 15 provided in the track.

Figure 6:
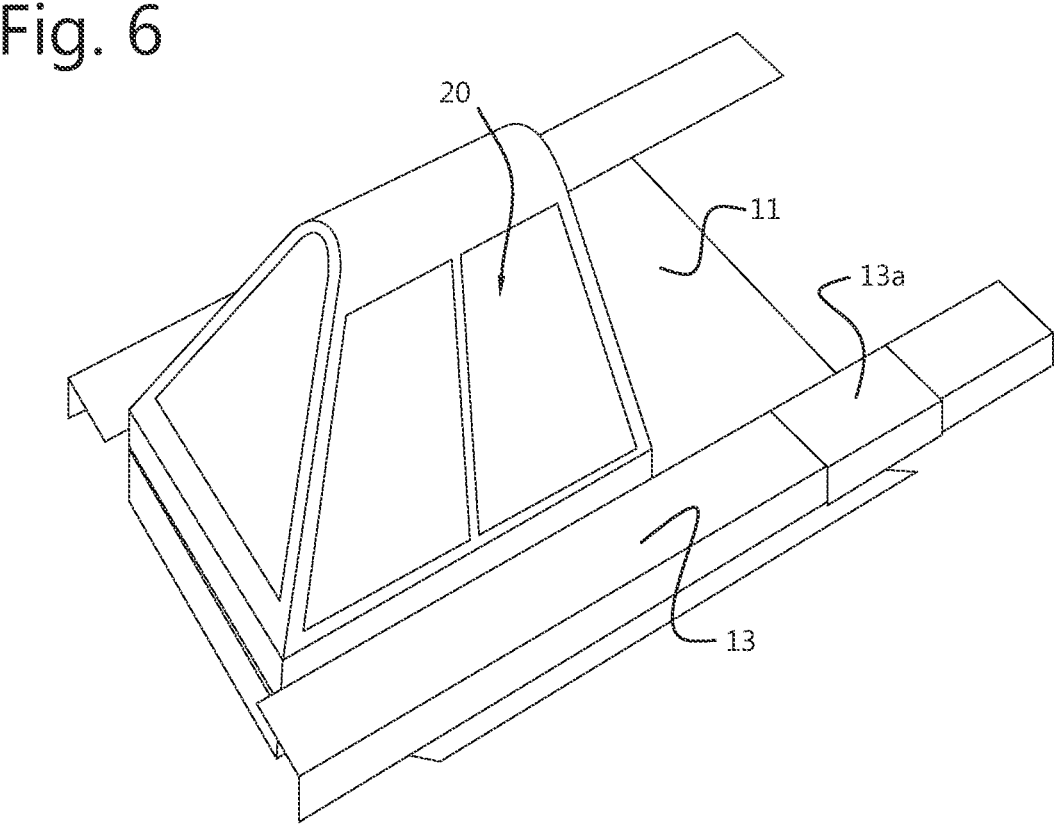

FIG. 6 shows an artist impression of the present vehicle module 20 moving over track 11, with guiders 13 provided at sides thereof, which guiders are sub-divided in sections 13*a*.

Figure 7:
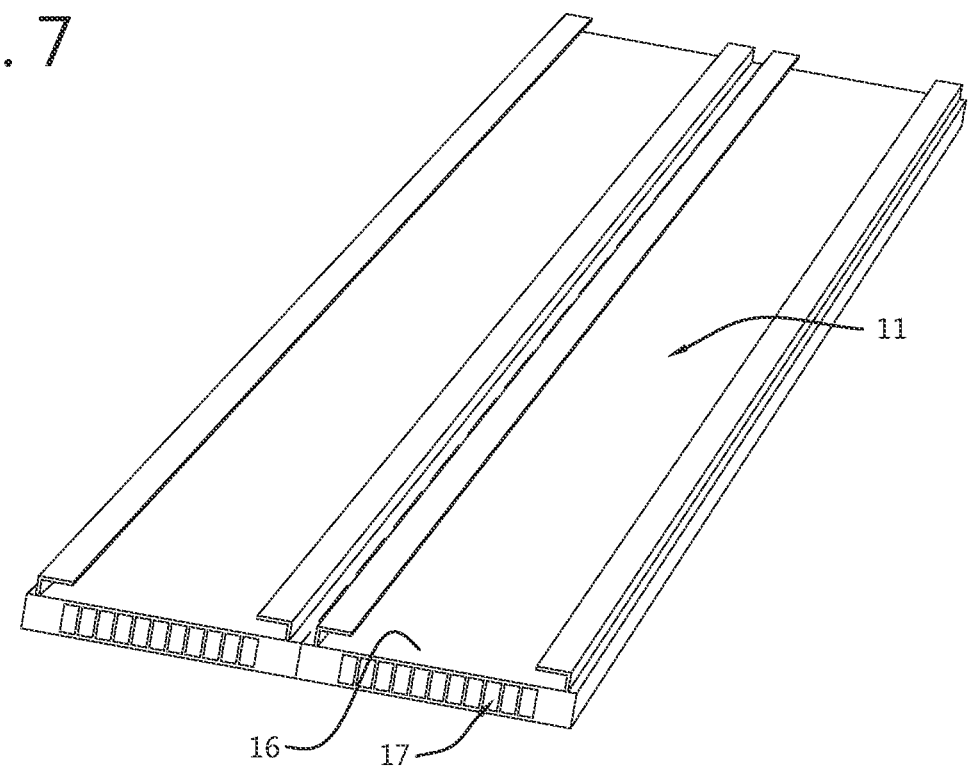

FIG. 7 shows an artist impression of the present track 11, projected over a bicycle lane, with hollow tube 17 and protective layer 16.

Figure 8:
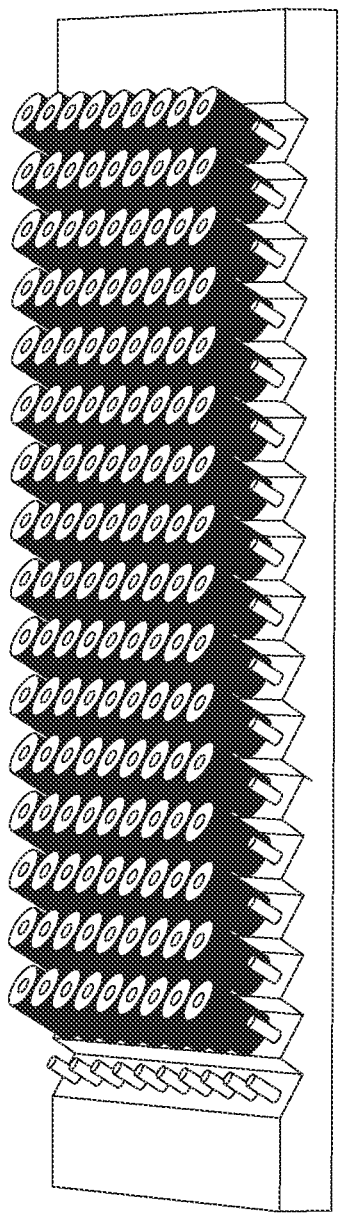

FIG. 8 shows an array of coils.

The figures are further detailed in the description.

EXAMPLES/EXPERIMENTS

The invention although described in detailed explanatory context may be best understood in conjunction with the accompanying examples of present small-scale prototypes and figures as detailed above.

In simulating a track with an array of eight rows of eight coils, for non-tilted and tilted (30°) variants, it is found that contributions of the neighbouring coils in the array tend to "dampen" the intensities of the fields in the middle of the array. Stronger edge effects are observed, which give the higher contributions to the lift and x-propulsion forces. Switching a single coil row at a time results in higher field contributions due to edge effects, when compared to a fully-powered coil array, along with a lower overall power consumption. Then, in order to pulse each coil as the pod travels above the coil track, a switching mechanism is developed.

For s small scale pod eight Halbach arrays of 12×1 with 3 mm×3 mm×3 mm NdFeB cube magnets is used. In addition an array of 41 NdFeB cube magnets of 4 mm×4 mm×4 mm was used, wherein magnets in odd rows were rotated 45°. For the road track an assembly of multiple coil arrays had to be made. Thereto a winding machine was used. The ferromagnets assembled were made of 120 wire turns, arranged in two layers, with 60 turns per layer. The number of coils per layer is kept as precise as possible by using the turn counter in the winding machine. Then the polarity of the coils has been determined. For a test current of 530 mA a levitation height of the order of few mm is observed. This shows that overcoming of gravitational forces by means of magnetic repulsion is thus possible.

In a further stage a 3-D printed type-B washboard (FIG. 8) was used with 16 coil arrays, consisting of 8 coils per array. In order to achieve controllable motion of the pod along the horizontal x-axis, and to limit the intrinsic magnetic field instability effects, a glider frame is used. The glider frame has a binary height of 6 mm. This height is found to limit friction between binary and pod, while at the same time ensuring that the travelling pod does not deviate from the binary track. The switching profile mechanism employed for the NIFTI assembly is based on an Arduino 2×8 Relay Board, which is controlled by an Arduino Motherboard. Once a switching program is loaded into the Motherboard, time-switching commands are given to the relays through pin connections. Further a voltage generator combo is connected to a common ground terminal and to high-voltage terminals of the prototype. The high-voltage common terminal connects the power generator combo to each of the 16 Relays high current circuit inputs. The state of the relay, which can be in either of these deactivated/activated configurations is determined by the switching time profile inputs, sent through connection pins by the Arduino Motherboard: when the relay system is not turned on the activated configuration there is no current flowing through the relay high current circuit output. The output terminal for each relay is connected to the positive ends of each coil array. Current is then ready to be pulsed by the switching mechanism through the coil array assembly at specific times, transmitted to the relay hardware through the motherboard.

For simulating currents of 0.5-10 A were used, giving an acceleration of 0.86-5.78 m/s², and a levitation of 7.3-23.2 mm, with a voltage of 72V. For switching of the coils an acceleration of 5.5 m/s² was used. The coils were tilted at 30°. A simulated switching time during which each coil array, or part thereof, is provided with a supplied current was 50 ms, whereas an experimental value was 100 ms. A time interval, allowing the pod to travel from a first row of coils to a next row of coils was used to determine a switching sequence of subsequent rows of coils.

Returning to a full-scale infrastructure, some exemplary qualifications and quantifications are given below.

1. The mass of the entire vehicle with passengers is about 600 kg, and without passengers it is about 300 kg. This is much less mass than an electric car. The transport module optimally has the form of a flattened sphere or of an ellipsoid.

2. The magnet is a square plate magnet with height 0.05 m and sides 0.8 m. The mass of the magnet is 160 kg. For the purposes of calculating the magnetic force necessary for levitation, only the centre of mass of the magnet array is required.

3. With these parameters, the necessary current turns out to be between 10 A and 30 A. This is the most important parameter for determining the total energy consumption. 4. The diameter of the coils is 10 cm, their height is 25 cm and they have 125 windings. The wire is made of copper with resistivity $\rho=2.10^{-6}$ Ωm and diameter of 2 mm. There are a total of 10 coils in each series.

5. The effective magnetization of the magnet is $\mu_0 M=2$ T.

6. The density is $\rho=5000$ kg/m³.

To compare NIfTI with an electric car, motion along a track of 10 km is discussed. An electric car uses about 34 kWh per 100 miles, which is about $7.606 \cdot 10^6$ J per 10 km. It is assumed that the entirety of the 10 km track contains rows of coils. There are then $10^4/d$ rows of coils. I=20 A, N=125, $\rho=2.10^{-8}$ Ωm and d=0.1 m. The typical diameter of a copper wire is r=1 mm. It remains to determine Δt. Assuming the pod moves at a velocity of 16 m/s results in Δt=0.06 s. When part of the track is void of coils, such as 20-60% thereof, and small permanent magnets are inserted into the cores of all or some of the coils, an according reduction of energy use is obtained (factor of 1.5-5, such as 2). An energy consumption would then be about 20-50% of that of an electric car. In addition, costs of operation, including maintenance, depreciation, and so one, are a factor lower as well; in an estimate a factor 3 lower.

In conclusion the present system of human transport is a self-driving module which is propelled by a system of coils interacting with an on-board magnet. The vehicle can run on 10-30 A and can reach the usual velocities of a car. Furthermore, it possesses some major benefits with respect to either traditional cars or electric cars. It uses about 20-50% of the energy of an electric car and costs about 30% of the amount of money that goes into an electric car. Furthermore, it provides environmental and ethical benefits with respect to the traditional ways of human transport.

What is claimed is:

1. A method of transferring a vehicle module over an infrastructure, comprising
   providing the infrastructure, wherein the infrastructure comprises
      at least one individual track, wherein the at least one individual track comprises at least one series of coils, wherein the at least one series of coils extend in the direction of a width of the at least one track, wherein each of the at least one series of coils is adapted to provide a levitational magnetic force and a horizontal magnetic force, wherein the horizontal magnetic force is directed along a length direction of the at least one track, wherein the at least one series of coils are placed at a distance from one another, wherein there is at least one switch per at least one series of coils, wherein each coil in the at least one series of coils can be individually energized by an electrical current and de-energized, wherein windings of each coil in the at least one series of coils are substantially parallel to a ground of the infrastructure, wherein each coil in the at least one series of coils can be energized in a pulsed mode, wherein a guider is provided on at least one side of the at least one track, wherein the guider comprises at least one guider section, wherein each at least one guider section can be individually energized, wherein the guider is adapted to control a motion of the vehicle module,
      a controller for individually energizing each coil in the at least one series of coils,
      an electrical power supply for providing an electrical current,
   providing the vehicle module, wherein the vehicle module comprises an array of permanent magnets,
   providing a vertical magnetic field in the at least one track at a first location of the vehicle module, thereby lifting the module,
   providing a first horizontal magnetic field in the at least one track at the first location of the vehicle module, thereby hovering the module at a certain speed in a horizontal direction over the at least one track and moving the vehicle to a second location,
   cancelling the first horizontal magnetic field and providing an opposite second horizontal magnetic field in the at least one track, thereby decelerating the module in the horizontal direction, and
   cancelling the vertical magnetic field in the at least one track thereby letting the module down to the at least one track.

2. The method according to claim 1, comprising two or more series of coils wherein two series of coils of the two or more series of coils are interrupted by at least one plate, the at least one plate being one of an electrically conducting plate and permanent magnet plate, wherein the at least one plate extends in a longitudinal direction and width direction of the at least one track.

3. The method according to claim 1, wherein the at least one series of coils comprises, each individually, at least one tilted coil, the at least one tilted coil having a part thereof which is arranged neither orthogonal nor parallel to the horizontal direction.

4. The method according to claim 1, comprising a feature selected from
   two series of coils are separated by a mutual distance of 5-50 cm,
   the at least one track has a width of 0.6-3 m,
   the vehicle module has a width of 0.6-3 m,
   the vehicle module has a length of 0.6-3 m,
   the empty vehicle module has a weight of 200-600 kg,
   at least two vehicle modules are connectable,
   the coil in the at least one series of coils, each individually, has a length 1-60 cm,
   the coil in the at least one series of coils, each individually, has a radius of 1-20 cm,
   the coil in the at least one series of coils, each individually, has a thickness of 0.1-10 cm,
   the coil in the at least one series of coils, each individually, has a number of windings $n_c \in [1,10000]/m$,
   the coil in the at least one series of coils, each individually, comprises an electrically conducting material,
   the at least one series of coils is adapted to provide a magnetic field Bz of $10^{-3}$-$10^1$ [T], over a width of the at least one track 1-100/m coils in series are provided,
   two series of coils are separated by a distance of 1-20 cm,
   a magnet in the array of permanent magnets comprises high magnetic density materials, a magnet in the array of permanent magnets comprises at least one magnetic material selected from Group 3-12, Period 4-6 elements,
   each coil in the at least one series of coils individually is adapted to receive a current of 0.5-200 [A], wherein a switch is adapted to switch within a time of 1000 μsec,
   at least one switch per individual coil or per row of coils in the at least one series of coils, and wherein each coil in the at least one series of coils is adapted to be energized within a time of 1-$10^5$ μsec, and combinations thereof.

5. The method according to claim 1, wherein each coil or row of coils in the at least one series of coils is energized in pulses with a duration time of 1-100 msec.

6. The method according to claim 1, wherein the speed of the vehicle module is from 0-150 m/sec.

7. The method according to claim 1, wherein at least one of the vehicle modules comprises an array of magnets with a spatially rotating pattern of magnetisation, wherein a first magnet in the array of magnets has a first magnetization, an adjacent magnet in the array of magnets, adjacent to a next magnet in the array of magnets, has a magnetization rotated over π/n along a horizontal axis with respect to the adjacent magnet, wherein n is an integer, and an $n^{th}$ magnet in the array of magnets has a magnetization parallel to the first magnetization, such that below the array of magnets and bottom of the vehicle module an amplified magnetic flux remains and above the array of magnets a net magnetic flux is substantially cancelled,
   50-100% of the bottom of the vehicle is provided with magnets in the array of magnets,
   the magnets in the array of magnets have a height of 1-25 cm,
   a length of all magnets in the array of magnets is 20-200 cm,
   wherein magnets in the array of magnets are provided one of above or below the bottom of the vehicle, wherein a total volume of magnets in the array of magnets is $0.1*10^{-3}$-$100*10^{-3}$ m$^3$, wherein a magnetic moment of the array of magnets is 0.1-2000 Am$^2$, wherein coils in the at least one series of coils provide an acceleration of 0.01-10 m/sec$^2$, and wherein the guiders provide a deceleration of 1-20 m/sec$^2$.

8. A method according to claim 1, wherein the vehicle module comprises an array of magnets, wherein in the array of magnets at least one series of magnets comprises a spatially rotating pattern of magnetisation, and wherein a magnet in the array of magnets has a volumetric susceptibility of $10^3$-$10^6$.

9. The method according to claim 1, wherein the controller is adapted to control hovering and propagation of the vehicle module.

10. The method according to claim 1, wherein a multitude of vehicle modules is transferred.

11. The method according to claim 1, wherein the infrastructure is partly or fully incorporated in an existing infrastructure, and wherein each of the at least one track is individually covered by a protecting layer.

12. The method according to claim 1, wherein the guiders of the infrastructure are physical and controllable guiders, and wherein the infrastructure further comprises a rail, and guidance coils.

13. The method according to claim 1, wherein the vehicle module is a monocoque, and wherein a drag coefficient of the vehicle module $C_D$<0.3, and wherein the vertical magnetic field is applied to the centre of mass of the magnetic base of the vehicle module, and wherein the horizontal magnetic field is applied to the same centre of mass of the vehicle module, and wherein a vehicle module impact on collision is minimized.

14. The method according to claim 1, wherein at a junction of tracks at least one rotatable coil in the at least a series of coils is provided, wherein rotation along a vertical axis is provided, and wherein tracks at a junction are split, and wherein at a junction no guiders are provided.

15. An infrastructure for a method according to claim 1, comprising at least one individual track, wherein the at least one individual track comprises the at least one series of coils, wherein the at least one series of coils extend in the direction of the width of the track, wherein each of the at least one series of coils is adapted to provide a levitational magnetic force and a horizontal magnetic force, wherein the horizontal magnetic force is directed along the length direction of the track, wherein coils in the at least one series of coils are placed at a distance from one another, at least one switch is provided per series of coils in the at least one series of coils, wherein each coil in the at least one series of coils can be individually energized by an electrical current and de-energized, wherein on at least one side of the at least one guiders are provided, wherein the at least one guider comprises at least one section, wherein the at least one section of the guider can be individually energized, wherein the at least one guider is adapted to control motion of the vehicle module, a controller for energizing individual coils in the at least one series of coils, an electrical power supply for providing an electrical current.

16. The infrastructure according to claim 15, comprising a road and a hollow tube structure under the road, wherein a surface of the tube structure comprises a polymeric material, wherein coil receiving elements are provided in the tube structure.

* * * * *